(12) United States Patent
Wu et al.

(10) Patent No.: US 10,694,247 B2
(45) Date of Patent: Jun. 23, 2020

(54) METHOD AND APPARATUS FOR RECOMMENDING VIDEO

(71) Applicant: Baidu Online Network Technology (Beijing) Co., Ltd., Beijing (CN)

(72) Inventors: Wei Wu, Beijing (CN); Jiafeng Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/204,865

(22) Filed: Nov. 29, 2018

(65) Prior Publication Data

US 2019/0306568 A1 Oct. 3, 2019

(30) Foreign Application Priority Data

Mar. 30, 2018 (CN) .......................... 2018 1 0277378

(51) Int. Cl.
| | |
|---|---|
| *H04N 21/4415* | (2011.01) |
| *G06K 9/00* | (2006.01) |
| *G10L 17/00* | (2013.01) |
| *G10L 17/18* | (2013.01) |
| *H04N 21/466* | (2011.01) |

(52) U.S. Cl.
CPC ..... *H04N 21/4415* (2013.01); *G06K 9/00288* (2013.01); *G10L 17/005* (2013.01); *G10L 17/18* (2013.01); *H04N 21/4668* (2013.01)

(58) Field of Classification Search
CPC ................................................ H04N 21/4415
See application file for complete search history.

(56) References Cited

U.S. PATENT DOCUMENTS

| | | | |
|---|---|---|---|
| 2010/0251333 A1 | 9/2010 | Miura et al. | |
| 2014/0115635 A1* | 4/2014 | Mashimo ........... | H04N 21/4668 725/53 |
| 2015/0082330 A1* | 3/2015 | Yun ...................... | H04N 21/233 725/14 |
| 2015/0365728 A1* | 12/2015 | Lu ...................... | H04N 21/4667 725/25 |

(Continued)

FOREIGN PATENT DOCUMENTS

| | | |
|---|---|---|
| CN | 105049882 A | 11/2015 |
| CN | 106096520 A | 11/2016 |
| JP | 2004101901 A | 4/2004 |

(Continued)

*Primary Examiner* — Michael H Hong
(74) *Attorney, Agent, or Firm* — Nixon Peabody LLP

(57) ABSTRACT

Embodiments of the present disclosure disclose a method and apparatus for recommending a video. The method includes: receiving a video recommendation request sent by a terminal device, the video recommendation request including a first voice, the first voice being a voice inputted by a user requesting a video recommendation; determining, from user voices stored in a server, a second voice having a greatest similarity with the first voice; and sending information of a target video to the terminal device according to a user profile corresponding to the second voice, if a first confidence recognizing the user as a user corresponding to the second voice being greater than or equal to a first threshold. The method and apparatus for recommending a video according to the embodiments of the present disclosure have a high accuracy of video recommendation.

19 Claims, 9 Drawing Sheets

(56) References Cited

U.S. PATENT DOCUMENTS

2017/0164049 A1* 6/2017 Wang ................... G10L 17/02
2018/0338178 A1* 11/2018 Richman ............ G06K 9/00926

FOREIGN PATENT DOCUMENTS

| JP | 2015194864 A | 11/2015 |
| WO | 2009057485 A1 | 5/2009 |
| WO | 2017039884 A1 | 3/2017 |

\* cited by examiner

METHOD AND APPARATUS FOR RECOMMENDING VIDEO

CROSS-REFERENCE TO RELATED APPLICATIONS

This application is related to and claims priority from Chinese Application No. 201810277378.4, filed on Mar. 30, 2018 and entitled "Method and Apparatus for Recommending Video," the entire disclosure of which is hereby incorporated by reference.

TECHNICAL FIELD

Embodiments of the present disclosure relate to computer technology, and more specifically to a method and apparatus for recommending a video.

BACKGROUND

With the continuous development of artificial intelligence, there are more and more types of smart terminals such as smart voice television products, and users may operate the televisions by voice.

In the related art, a smart voice television has at least one user, and the behavior data generated by all users through the smart voice television correspond to the identifier of the smart voice television, that is, a server generates a user profile based on the data of all the users of the smart voice television, and the user profile corresponds to the identifier of the terminal device.

If a user A wants the smart voice television to recommend a video, the smart voice television sends a video recommendation request to the server, and the server determines a video to be recommended to the user according to the user profile generated based on the data of all the users, rather than determining the video to be recommended to the user according to the user profile generated based on the data of the user A. Therefore, the video to be recommended to the user selected by the server is not necessarily a video that the user is interested in, and the accuracy in recommending a video to the user is not high.

SUMMARY

Embodiments of the present disclosure provide a method and apparatus for recommending a video, to solve the technical problem that the accuracy of recommending a video to a user is not high in the related art.

In a first aspect, the embodiments of the present disclosure provide a method for recommending a video, including: receiving a video recommendation request sent by a terminal device, the video recommendation request including a first voice, the first voice being a voice inputted by a user requesting a video recommendation; determining, from user voices stored in a server, a second voice having a greatest similarity with the first voice; and sending information of a target video to the terminal device according to a user profile corresponding to the second voice, if a first confidence recognizing the user as a user corresponding to the second voice being greater than or equal to a first threshold.

In an embodiment, the video recommendation request further includes an identifier of the terminal device; then the sending information of a target video to the terminal device according to a user profile corresponding to the second voice, includes: sending the information of the target video to the terminal device according to the user profile corresponding to the second voice and the identifier of the terminal device.

In an embodiment, the video recommendation request further includes a first face image of the user, and if the first confidence is less than the first threshold and greater than a second threshold, the method further includes: determining, from face images stored in the server, a second face image having a greatest similarity with the first face image of the user; and sending the information of the target video to the terminal device according to a user profile corresponding to the second face image and the identifier of the terminal device, if a second confidence recognizing the user as a user corresponding to the second face image being greater than or equal to a third threshold.

In an embodiment, if the first confidence is less than the first threshold and greater than a second threshold, the method further includes: receiving a first face image of the user sent by the terminal device; and determining, from face images stored in the server, a second face image having a greatest similarity with the first face image of the user; and sending the information of the target video to the terminal device according to a user profile corresponding to the second face image and the identifier of the terminal device, if a second confidence recognizing the user as a user corresponding to the second face image being greater than or equal to a third threshold.

In an embodiment, before the receiving a first face image of the user sent by the terminal device, the method further includes: sending an image acquisition instruction to the terminal device, the image acquisition instruction being used to instruct the terminal device to acquire the first face image of the user.

In an embodiment, if the first confidence is less than or equal to a second threshold, the method further includes: allocating a user identifier to the user of the terminal device, and storing the user identifier and the first voice in association.

In an embodiment, the method further includes: receiving a first face image of the user sent by the terminal device; and storing the user identifier and the first face image in association.

In an embodiment, the sending the information of the target video to the terminal device according to the user profile corresponding to the second voice and the identifier of the terminal device includes: determining, according to the identifier of the terminal device, a video viewing right of a user of the terminal device; determining the target video from a plurality of videos corresponding to the video viewing right of the user of the terminal device according to the user profile corresponding to the second voice; and sending the information of the target video to the terminal device.

In an embodiment, the determining, from user voices stored in a server, a second voice having a greatest similarity with the first voice, includes: acquiring a first characteristic vector of the first voice according to a voiceprint characteristic of the first voice and a neural network algorithm; and determining, according to the first characteristic vector and a second characteristic vector of each user voice stored in the server, the second voice having the greatest similarity with the first voice from the user voices stored in the server.

In an embodiment, the determining, from face images stored in the server, a second face image having a greatest similarity with the first face image of the user includes: acquiring a third characteristic vector of the first face image according to an image characteristic of the first face image and a neural network algorithm; and determining, according to the third characteristic vector and a fourth characteristic vector of each face image stored in the server, the second face image having the greatest similarity with the first face image in the face images stored in the server.

In a second aspect, the embodiments of the present disclosure provide a method for recommending a video, including: acquiring a first voice inputted by a user requesting a video recommendation; sending a video recommendation request to a server, the video recommendation request including the first voice; and receiving information of a target video sent by the server; the information of the target video being acquired according to a user profile corresponding to a second voice, after the server determining that a first confidence recognizing the user as a user corresponding to the second voice being greater than or equal to a first threshold; or, the information of the target video being acquired according to a user profile corresponding to a second face image, after the server determining that the first confidence recognizing the user as the user corresponding to the second voice being less than the first threshold and greater than a second threshold, and a second confidence recognizing the user as a user corresponding to the second face image being greater than or equal to a third threshold.

In an embodiment, the video recommendation request further includes an identifier of a terminal device; and the information of the target video being acquired according to a user profile corresponding to a second voice and the identifier of the terminal device, after the server determining that a first confidence recognizing the user as a user corresponding to the second voice being greater than or equal to a first threshold; or, the information of the target video being acquired according to a user profile corresponding to a second face image and the identifier of the terminal device, after the server determining that the first confidence recognizing the user as the user corresponding to the second voice being less than the first threshold and greater than a second threshold, and a second confidence recognizing the user as a user corresponding to the second face image being greater than or equal to a third threshold.

In an embodiment, the acquiring a first voice inputted by a user requesting a video recommendation includes: acquiring the first voice inputted by the user requesting the video recommendation and a first face image of the user; and the sending a video recommendation request to a server, the video recommendation request including the first voice and the identifier of the terminal device, includes: sending the video recommendation request to the server, the video recommendation request including the first voice, the identifier of the terminal device and the first face image.

In an embodiment, the method further includes: receiving an image acquisition instruction sent by the server; acquiring a first face image of the user according to the image acquisition instruction; and sending the first face image to the server.

In a third aspect, the embodiments of the present disclosure provide an apparatus for recommending a video, including: a receiving module, configured to receive a video recommendation request sent by a terminal device, the video recommendation request including a first voice, the first voice being a voice inputted by a user requesting a video recommendation; a determination module, configured to determine, from user voices stored in a server, a second voice having a greatest similarity with the first voice; and a sending module, configured to send information of a target video to the terminal device according to a user profile corresponding to the second voice, if a first confidence recognizing the user as a user corresponding to the second voice being greater than or equal to a first threshold.

In an embodiment, the video recommendation request further includes an identifier of the terminal device; then the sending module is specifically configured to: send the information of the target video to the terminal device according to the user profile corresponding to the second voice and the identifier of the terminal device.

In an embodiment, the video recommendation request further includes a first face image of the user, and if the first confidence is less than the first threshold and greater than a second threshold, the determination module is configured to determine, from face images stored in the server, a second face image having a greatest similarity with the first face image of the user; and the sending module is configured to send the information of the target video to the terminal device according to a user profile corresponding to the second face image and the identifier of the terminal device, if a second confidence recognizing the user as a user corresponding to the second face image being greater than or equal to a third threshold.

In an embodiment, if the first confidence is less than the first threshold and greater than a second threshold, the receiving module is configured to receive a first face image of the user sent by the terminal device; the determination module is configured to determine, from face images stored in the server, a second face image having a greatest similarity with the first face image of the user; and the sending module is configured to send the information of the target video to the terminal device according to a user profile corresponding to the second face image and the identifier of the terminal device, if a second confidence recognizing the user as a user corresponding to the second face image being greater than or equal to a third threshold.

In an embodiment, before the receiving a first face image of the user sent by the terminal device, the sending module is further configured to send an image acquisition instruction to the terminal device, the image acquisition instruction being used to instruct the terminal device to acquire the first face image of the user.

In an embodiment, if the first confidence is less than or equal to a second threshold, the apparatus further includes: a storage module, configured to allocate a user identifier to the user of the terminal device, and store the user identifier and the first voice in association.

In an embodiment, if the first confidence is less than or equal to a second threshold, the receiving module is further configured to receive a first face image of the user sent by the terminal device; and the storage module is further configured to store the user identifier and the first face image in association.

In an embodiment, the sending module is specifically configured to: determine, according to the identifier of the terminal device, a video viewing right of a user of the terminal device; determine the target video from a plurality of videos corresponding to the video viewing right of the user of the terminal device according to the user profile corresponding to the second voice; and send the information of the target video to the terminal device.

In an embodiment, the determination module is configured to: acquire a first characteristic vector of the first voice according to a voiceprint characteristic of the first voice and a neural network algorithm; and determine, according to the first characteristic vector and a second characteristic vector of each user voice stored in the server, the second voice having the greatest similarity with the first voice from the user voices stored in the server.

In an embodiment, the determination module is further configured to: acquire a third characteristic vector of the first face image according to an image characteristic of the first face image and a neural network algorithm; and determine, according to the third characteristic vector and a fourth characteristic vector of each face image stored in the server, the second face image having the greatest similarity with the first face image from the face images stored in the server.

In a fourth aspect, the embodiments of the present disclosure provide an apparatus for recommending a video, including: an acquisition module, configured to acquire a first voice inputted by a user requesting a video recommendation; a sending module, configured to send a video recommendation request to a server, the video recommendation request including the first voice; and a receiving module, configured to receive information of a target video sent by the server; the information of the target video being acquired according to a user profile corresponding to a second voice, after the server determining that a first confidence recognizing the user as a user corresponding to the second voice being greater than or equal to a first threshold; or, the information of the target video being acquired according to a user profile corresponding to a second face image, after the server determining that the first confidence recognizing the user as the user corresponding to the second voice being less than the first threshold and greater than a second threshold, and a second confidence recognizing the user as a user corresponding to the second face image being greater than or equal to a third threshold.

In an embodiment, the video recommendation request further includes an identifier of the terminal device; and the information of the target video being acquired according to a user profile corresponding to a second voice and the identifier of the terminal device, after the server determining that a first confidence recognizing the user as a user corresponding to the second voice being greater than or equal to a first threshold; or, the information of the target video being acquired according to a user profile corresponding to a second face image and the identifier of the terminal device, after the server determining that the first confidence recognizing the user as the user corresponding to the second voice being less than the first threshold and greater than a second threshold, and a second confidence recognizing the user as a user corresponding to the second face image being greater than or equal to a third threshold.

In an embodiment, the acquisition module is specifically configured to: acquire the first voice inputted by the user requesting the video recommendation and a first face image of the user; and the sending module is specifically configured to send the video recommendation request to the server, the video recommendation request including the first voice, the identifier of the terminal device and the first face image.

In an embodiment, the receiving module is further configured to receive an image acquisition instruction sent by the server; the acquisition module is further configured to acquire a first face image of the user according to the image acquisition instruction; and the sending module is further configured to send the first face image to the server.

In a fifth aspect, the embodiments of the present disclosure provide a computer readable storage medium, storing a computer program thereon, the program causes a processor to implement the method according to the first aspect and any of the possible designs of the first aspect.

In a sixth aspect, the embodiments of the present disclosure provide a server, including a memory and a processor; the memory, for storing program instructions; and the processor, for invoking the program instructions stored in the memory to implement the method according to the first aspect and any of the possible designs of the first aspect.

In a seventh aspect, the embodiments of the present disclosure provide a computer readable storage medium, storing a computer program thereon, the program causes a processor to implement the method according to the second aspect and any of the possible designs of the second aspect.

In an eighth aspect, the embodiments of the present disclosure provide a terminal device, including a memory and a processor; the memory, for storing program instructions; and the processor, for invoking the program instructions stored in the memory to implement the method according to the second aspect and any of the possible designs of the second aspect.

The server of the embodiments of the present disclosure stores the user profile of each user of the terminal device. The terminal device does not recommend a video to the user according to the user profiles of all users of the terminal device, but recognizes the current user by the voice of the current user, and recommends a video to the user according to the user profile of the current user, increasing the accuracy of video recommendation. Moreover, only if the confidence of the recognition result is greater than or equal to a preset threshold, the current recognition result is considered to be trustworthy, and a video is recommended to the user according to the user profile of the user corresponding to the current recognition result, thereby further improving the accuracy of video recommendation.

BRIEF DESCRIPTION OF THE DRAWINGS

In order to illustrate the technical solutions in the embodiments of the present disclosure more clearly, the accompanying drawings used in the description of the embodiments will be briefly described below. Apparently, the accompanying drawings in the following description are some embodiments of the present disclosure, and other accompanying drawings may be obtained based on these accompanying drawings for those skilled in the art without any inventive efforts.

DETAILED DESCRIPTION OF EMBODIMENTS

To make the objectives, the technical solution and the advantages of the embodiments of the present disclosure clearer, the technical solution of the embodiments of the present disclosure will be clearly and completely described hereinafter with reference to the accompanying drawings in the embodiments of the present disclosure. Apparently, the embodiments described below are a part, instead of all, of the embodiments of the present disclosure. Based on the embodiments of the present disclosure, all other embodiments obtained by those skilled in the art without inventive efforts fall within the scope of protection of the present disclosure.

Figure 1:
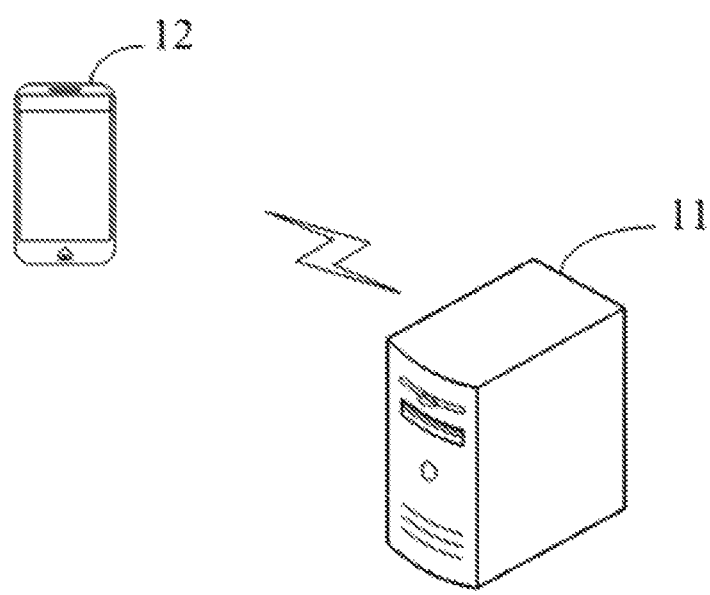
FIG. 1 is a system architecture diagram according to an embodiment of the present disclosure.

FIG. 1 is a system architecture diagram according to an embodiment of the present disclosure. Referring to FIG. 1, the architecture includes: a terminal device 12 and a server 11. Here, the server stores respective user profiles of at least one user of the terminal device, and the identifier of each user profile includes an identifier of the corresponding user.

Specifically, the terminal device 12 sends a video recommendation request to the server 11, and the video recommendation request includes a first voice of a user requesting a video recommendation. The server 11 determines, from user voices stored therein, a second voice having the greatest similarity with the first voice, determines a target video according to a user profile corresponding to the second voice if a first confidence recognizing the user as a user corresponding to the second voice is greater than or equal to a first threshold, and sends information of the target video to the terminal device; determines, from face images stored in the server, a second face image having the greatest similarity with a first face image of the user, if the first confidence is less than the first threshold and greater than a second threshold; and sends the information of the target video to the terminal device according to a user profile corresponding to the second face image, if a second confidence recognizing the user as a user corresponding to the second face image is greater than or equal to a third threshold.

The server of the embodiments of the present disclosure stores the user profile of each user of the terminal device. The terminal device does not recommend a video to the user according to the user profiles of all users of the terminal device, but recognizes the current user through the voice of the current user, and recommends a video to the user according to the user profile of the current user, increasing the accuracy of video recommendation. Moreover, only if the confidence of the recognition result is greater than or equal to a preset threshold, the current recognition result is considered to be trustworthy, and a video is recommended to the user according to the user profile of the user corresponding to the current recognition result, thereby further improving the accuracy of video recommendation.

Figure 2:
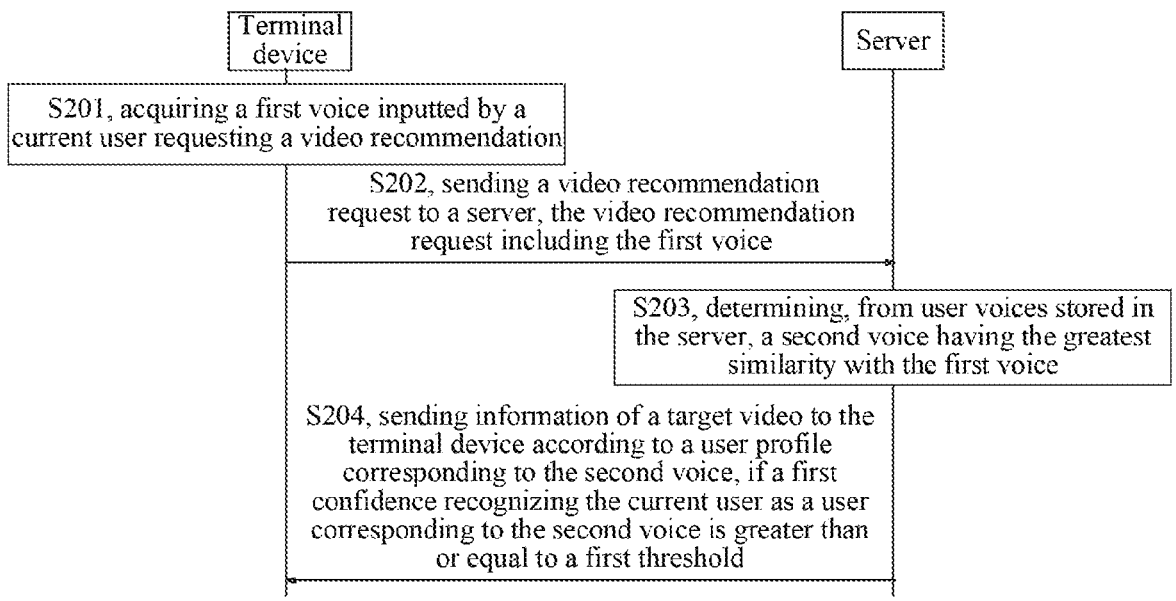
FIG. 2 is a signaling interaction diagram 1 of a method for recommending a video according to the present disclosure.

FIG. 2 is a signaling interaction diagram 1 of a method for recommending a video according to the present disclosure, as shown in FIG. 2, the method of the present embodiment may include the following steps.

Step S201, the terminal device acquires a first voice inputted by a current user requesting a video recommendation.

Step S202, the terminal device sends a video recommendation request to a server, the video recommendation request including the first voice.

Step S203, the server determines, from user voices stored in the server, a second voice having the greatest similarity with the first voice.

Step S204, the server sends information of a target video to the terminal device according to a user profile corresponding to the second voice, if a first confidence recognizing the current user as a user corresponding to the second voice is greater than or equal to a first threshold.

Specifically, the terminal device of the present embodiment may be a device that may be operated by voice, such as a smart voice television or a tablet computer.

The smart voice television is used as an example to describe the video recommendation process in steps S201 to S204.

For step S201, if the current first user needs the smart voice television to recommend a video, the user sends a voice such as "Please recommend me a video" or "What good movies are out recently" or "Please recommend me a good TV show". These voices are voices of the user requesting a video recommendation, referred to herein as the first voice.

Here, the voice acquisition unit of the smart voice television acquires the first voice of the first user.

For step S202, after the first voice of the first user is obtained, the smart voice television sends a video recommendation request to the server, and the video recommendation request includes the first voice.

It may be understood by those skilled in the art that the voice of the first voice may be sent to the server in the form of a binary stream.

For step S203, the server receives the video recommendation request sent by the smart voice television, converts the first voice (actually a binary voice stream) into identifiable text information, and determines the intention of the first user based on the text information, for example, the intention of the user is: recommending movies or TV shows or variety shows.

The server stores at least one user voice, and the identifier of each user voice includes an identifier of the corresponding user and an identifier of the terminal device.

For example, the voice of the user B is stored in the server, and the voice of the user B is sent to the server by the smart voice television b, then the identifier of the second voice of the user B includes the identifier of the user B and the identifier of the smart voice television. Here, the identifier of the user B may be 100, and the identifier of the smart voice television b may be 000.

For example, the voice of the user C is stored in the server, and the voice of the user C is sent to the server by the smart voice television b, then the identifier of the voice of the user C includes the identifier of the user C and the identifier of the smart voice television. Here, the identifier of the user C may be 000, and the identifier of the smart voice television b may be 000.

The above cases indicate that the user B and the user C are both users of the smart voice television b.

In addition, the identifier of each user voice stored in the server may also include only the identifier of the user.

The server also stores a plurality of user profiles of the respective users, and the identifier of each user profile includes: an identifier of the corresponding user and an identifier of the corresponding terminal device or only an identifier of the corresponding user.

The user identifier in the identifier of the voice and the identifier of the user profile of the same user are the same, that is, the voice and the user profile stored in the server are in one-to-one correspondence.

The method for determining a second voice having the greatest similarity with the first voice from user voices stored in the server is described as follow.

A first implementable method is: extracting a second voiceprint characteristic of each user voice, and the Merpe cepstrum coefficients in the related art may be used to characterize the voiceprint characteristic. The second voiceprint characteristics of a plurality of second voices are used as training samples, and a deep convolutional neural network model is obtained based on the deep convolutional neural network. Then, for each user voice, the second voiceprint characteristic of the user voice is used as an input of the deep convolutional neural network, and the trained deep convolutional neural network model is used to obtain a second characteristic vector corresponding to the user voice. In this way, the second characteristic vector corresponding to each user voice, that is, the second characteristic vector of the user corresponding to each user voice, is obtained.

Extracting a first voiceprint characteristic of the first voice, using the first voiceprint characteristic as an input of the deep convolutional neural network, and using the trained deep convolutional neural network model to obtain a first characteristic vector corresponding to the first voice.

Determining, based on the first characteristic vector and each second characteristic vector, the second voice having the greatest similarity with the first voice from the user voices stored in the server, specifically includes: acquiring a distance between the first characteristic vector and each second characteristic vector, the user voice corresponding to the second characteristic vector having the shortest distance from the first characteristic vector is the second voice. That is, the shorter the distance between the two characteristic vectors is, the greater the similarity of the voices corresponding to the characteristic vectors is. The distance may be a Euclidean distance, a cosine distance, or the like, which is not limited in the present embodiment.

For example, the server has user voice 1, user voice 2, user voice 3, and user voice 4, and the Euclidean distance between the second characteristic vector corresponding to the user voice 1 and the first characteristic vector is the shortest, then the user voice 1 is the second voice having the greatest similarity with the first voice.

It may be understood that the deep convolutional neural network model and the respective second characteristic vectors of the user voices may be acquired in advance and then stored in the server.

A second implementable method is: extracting a second voiceprint characteristic of each user voice, and the Merpe cepstrum coefficients in the related art may be used to characterize the voiceprint characteristic. Performing vector quantization processing on each second voiceprint characteristic to obtain a second vector quantization codebook corresponding to the second voiceprint characteristic, that is, the second vector quantization codebook of the user corresponding to the second voiceprint characteristic. The vector quantization processing method is a method in the related art, and detailed description thereof will be omitted in the present embodiment.

Extracting a first voiceprint characteristic of the first voice, performing vector quantization processing on the first voiceprint characteristic to obtain a first vector quantization codebook corresponding to the first voiceprint characteristic, that is, the first vector quantization codebook of the user corresponding to the second voiceprint characteristic.

Determining, based on the first vector quantization codebook and each second vector quantization codebook, the second voice having the greatest similarity with the first voice from the user voices stored in the server, specifically includes: acquiring a Euclidean distance between the first vector quantization codebook and each second vector quantization codebook, and determining the user voice corresponding to the second vector quantization codebook having the shortest Euclidean distance from the first vector quantization codebook as the second voice. That is, the shorter the Euclidean distance between the two vector quantization codebooks is, the greater the similarity of the voices corresponding to the vector quantization codebooks is.

For example, the server has user voice 1, user voice 2, user voice 3, and user voice 4, and the Euclidean distance between the second vector quantization codebook corresponding to the user voice 1 and the first vector quantization codebook is the shortest, then the user voice 1 is the second voice having the greatest similarity with the first voice.

It may be understood that the respective second vector quantization codebooks of the user voices may be acquired in advance and stored in the server.

A third implementable method is: acquiring a second characteristic vector of each user voice and a first characteristic vector of the first voice (the method is the same as the first implementable method described above), directly calculating the similarity between each second voice and the first voice based on each second characteristic vector and the first characteristic vector, and determining the user voice having the greatest similarity as the second voice.

Here, the method for acquiring the similarity may adopt a method in the related art, and detailed description thereof will be omitted in the present embodiment.

It should be understood by those skilled in the art that the method for acquiring the second voice having the greatest similarity with the first voice from the user voices stored in the server is not limited to the above three implementable methods.

It may be understood that the user corresponding to the second voice having the greatest similarity with the first voice among the user voices stored in the server is not necessarily the same user as the first user currently requesting the video recommendation. Therefore, it is necessary to acquire the confidence recognizing the first user as the user corresponding to the second voice, which may be referred to herein as the first confidence.

The first confidence may be acquired based on the similarity between the first voice and each user voice stored in the server. Here, for the first and second implementable methods for determining the second voice, the similarity between the first voice and each user voice may be acquired by the following method.

The normalization method is used to normalize the distance value into a similarity value, where the normalization method includes a linear mapping, a piecewise linear mapping, or other methods of monotonic functions. Each of the above normalization methods is a method in the related art, and detailed description thereof will be omitted in the present embodiment.

The first confidence may be obtained through the following formula 2 to formula 4:

$$P(x) = \int_{-\infty}^{x} f(x \mid s) dx; \quad \text{formula 2}$$

$$f(x \mid s) = \frac{1}{\sqrt{2\pi}\,\sigma} e^{-\frac{(x-u)^2}{2\sigma^2}}; \quad \text{formula 3}$$

$$\sigma = \frac{1}{N} \sum_{i=1}^{N} (X_i - \overline{X})^2; \quad \text{formula 4}$$

Here, $\mu = \overline{X}$, $\overline{X}$ is the average value of all similarities, $N = C_{m_1 n_1}^2$, $m_1$ is the number of users corresponding to all user voices stored in the server, and $n_1$ is the number of voices corresponding to the same user stored in the server;

if the user voices stored in the server correspond to the users one by one, then $n_1=1$, and $m_1$ is the number of the user voices stored in the server.

For step S204, if the first confidence recognizing the current user as the user corresponding to the second voice is greater than or equal to the first threshold, the server sends the information of the target video to the terminal device according to the user profile corresponding to the second voice.

Here, the first threshold may be any value between 85 and 90.

If the first confidence is greater than or equal to the first threshold, it indicates that the credibility that the user corresponding to the second voice is the first user currently requesting the video recommendation is high, so that the target video recommended to the first user may be determined according to the user profile corresponding to the second voice, and the information of the target video is sent to the terminal device.

In addition, since the user of the terminal subscribes to some video contents that need to be paid according to the personalized requirements, the video recommendation request may further include the identifier of the terminal device, and the server sends the information of the target video to the terminal device according to the user profile corresponding to the second voice and the identifier of the terminal device, specifically includes: determining, by the server, according to the identifier of the terminal device, a video viewing right of a user of the terminal device, determining the target video from a plurality of videos corresponding to the video viewing right of the user of the terminal device according to the user profile corresponding to the second voice, and sending the information of the target video to the terminal device.

The process of acquiring the user profile stored in the server may be as follows: receiving voice 1 of user 1 operating the smart television sent by the terminal device, and recognizing the user 1 according to the voice 1 and a plurality of voices stored in the server, and the recognition method is the same as step 203 above. If the confidence recognizing the user corresponding to the voice 2 (the voice among the plurality of voices stored in the server) as the user 1 exceeds a preset threshold, the user corresponding to the voice 2 is considered to be the user 1, and the server corresponds the user data (the viewing duration, the video type, the channel, or the like) generated for the operation sent by the terminal device to the user identifier 1 of the user 1, and the server may generate the user profile of the user 1 based on all the user data corresponding to the user identifier 1.

In addition, after the terminal device receives the information of the target video, if the first user views at least part of the video in the target video, the terminal device sends the operation data of the first user to the at least part of the video in the target video to the server.

The operation data may include a video type of the target video viewed by the user, a viewing duration, or the like. After the server receives these operation data, these operation data are the basis for the server to subsequently update the user profile, since the user profile is acquired based on the data of the corresponding user.

The server of the embodiments of the present disclosure stores the user profile of each user of the terminal device. The terminal device does not recommend a video to the user according to the user profiles of all users of the terminal device, but recognizes the current user by the voice of the current user, and recommends a video to the user according to the user profile of the current user, increasing the accuracy of video recommendation. Moreover, only if the confidence of the recognition result is greater than or equal to a preset threshold, the current recognition result is considered to be trustworthy, and a video is recommended to the user according to the user profile of the user corresponding to the current recognition result, thereby further improving the accuracy of video recommendation.

Figure 3:
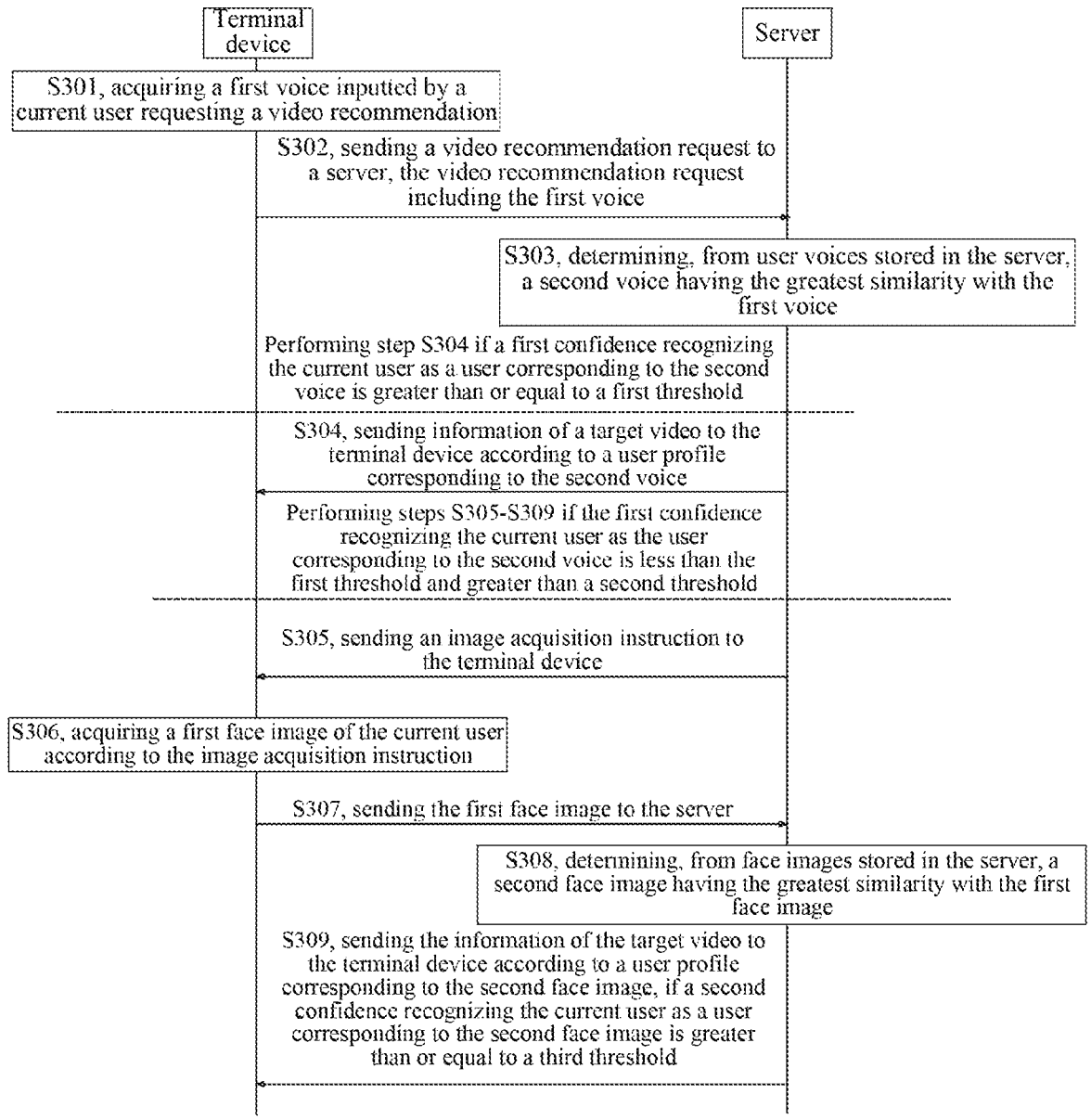
FIG. 3 is a signaling interaction diagram 2 of a method for recommending a video according to the present disclosure.

If the first confidence in the previous embodiment is less than the first threshold and greater than a second threshold, it indicates that the recognition result of the current first user is not very trustworthy, but is not completely untrustworthy. In this case, in order to be able to recommend a video to the user and ensure the accuracy of the recommended video, the present embodiment provides further improvements on the basis of the previous embodiment. FIG. 3 is a signaling interaction diagram 2 of a method for recommending a video according to an embodiment of the present disclosure. Referring to FIG. 3, the method for recommending a video of the present embodiment includes the following steps.

Step S301, the terminal device acquires a first voice inputted by a current user requesting a video recommendation.

Step S302, the terminal device sends a video recommendation request to a server, the video recommendation request including the first voice.

Step S303, the server determines, from user voices stored in the server, a second voice having the greatest similarity with the first voice.

If a first confidence recognizing the current user as a user corresponding to the second voice is greater than or equal to a first threshold, step S304 is performed.

Step S304, the server sends information of a target video to the terminal device according to a user profile corresponding to the second voice.

If the first confidence recognizing the current user as the user corresponding to the second voice is less than the first threshold and greater than a second threshold, steps S305-309 are performed.

Step S305, the server sends an image acquisition instruction to the terminal device.

Step S306, the terminal device acquires a first face image of the current user according to the image acquisition instruction.

Step S307, the terminal device sends the first face image to the server.

Step S308, the server determines, from face images stored in the server, a second face image having the greatest similarity with the first face image.

Step S309, if a second confidence recognizing the current user as a user corresponding to the second face image is greater than or equal to a third threshold, sending the information of the target video to the terminal device according to a user profile corresponding to the second face image.

Specifically, steps S301 to S304 refer to steps S201 to S204 in the previous embodiment, and detailed description thereof will be omitted in the present embodiment.

For steps S305 to S307, if the first confidence recognizing the current user as the user corresponding to the second voice is less than the first threshold and greater than the second threshold, the server sends an image acquisition instruction to the terminal device; the terminal device receives the image acquisition instruction, controls the camera to be turned on, acquires the first face image of the current user, and sends the first face image to the server.

For step S308, the server stores at least one face image, and the identifier of each face image includes the identifier of the corresponding user and the identifier of the terminal device.

For example, the face image of user B is stored in the server, the face image of the user B is sent to the server by the smart face image television b, and the identifier of the second face image of the user B includes the identifier of the user B and the identifier of the smart face image television. Here, the identifier of the user B may be 100, and the identifier of the smart face image television b may be 000.

For example, the face image of user C is stored in the server, the face image of the user C is sent to the server by the smart face image television b, and the identifier of the face image of the user C includes the identifier of the user C and the identifier of the smart face image television. Here, the identifier of the user C may be 000, and the identifier of the smart face image television b may be 000.

The above cases indicate that the user B and the user C are both users of the smart face image television b.

Furthermore, the identifier of each user face image stored in the server may also include only the identifier of the user.

The server also stores a plurality of user profiles of the respective users, and the identifier of each user profile includes: an identifier of the corresponding user and an identifier of the corresponding terminal device or only an identifier of the corresponding user.

The user identifier in the identifier of the face image and the user identifier in the identifier of the user profile of the same user are the same, that is, the face image and the user profile stored in the server are in one-to-one correspondence.

It may be understood that the face image, the user voice, and the user profile stored in the server are in one-to-one correspondence, that is, the face image and the user voice of the same user correspond to the same user profile.

The method for determining a second face image having the greatest similarity with the first face image from face images stored in the server is described as follow.

The first implementable method is: extracting a second image characteristic of a face image of each user, such as the Local Binary Pattern (LBP) value of each pixel. The second image characteristics of a plurality of second face images are used as training samples, and a deep convolutional neural network model is obtained based on the deep convolutional neural network. Then, for each face image stored in the server, the second image characteristic of the face image is used as an input of the deep convolutional neural network, and the trained deep deconvolution neural network model is used to obtain a fourth characteristic vector corresponding to the face image. In this way, the fourth characteristic vector corresponding to each face image is obtained, that is, the fourth characteristic vector of the user corresponding to each face image stored in the server is obtained.

Extracting a first image characteristic of the first face image, using the first image characteristic as an input of the deep convolutional neural network, and using the trained deep convolutional neural network model to obtain a third characteristic vector corresponding to the first face image.

Determining, based on the third characteristic vector and each fourth characteristic vector, the second face image having the greatest similarity with the first face image from the face images stored in the server, specifically includes: acquiring a distance between the third characteristic vector and each fourth characteristic vector, the face image corresponding to the fourth characteristic vector having the shortest distance from the third characteristic vector is the second face image. That is, the shorter the distance between the two characteristic vectors is, the greater the similarity of the face images corresponding to the characteristic vectors is. The distance may be a Euclidean distance, a cosine distance, or the like, which is not limited in the present embodiment.

For example, the server has face image 1, face image 2, face image 3, and face image 4, and the Euclidean distance between the fourth characteristic vector corresponding to the face image 1 and the third characteristic vector is the shortest, then the face image 1 is the second face image having the greatest similarity with the first face image.

It may be understood that the deep convolutional neural network model and the respective fourth characteristic vectors of the face images may be acquired in advance and then stored in the server.

A second implementable method is: acquiring a fourth characteristic vector of each face image and a third characteristic vector of the first face image (the method is the same as the first implementable method described above), directly calculating the similarity between each face image stored in the server and the first face image based on each fourth characteristic vector and the third characteristic vector, and determining the face image stored in the server having the greatest similarity with the first face image as the second face image.

Here, the method for acquiring the similarity may adopt a method in the related art, and detailed description thereof will be omitted in the present embodiment.

It should be understood by those skilled in the art that the method for acquiring the second face image having the greatest similarity with the first face image from the face images stored in the server is not limited to the above two implementable methods.

It may be understood that the user corresponding to the second face image having the greatest similarity with the first face image among the face images stored in the server is not necessarily the same user as the user currently requesting the video recommendation. Therefore, it is necessary to acquire the confidence recognizing the first user as the user corresponding to the second face image, which may be referred to herein as the second confidence.

The second confidence may be acquired based on the similarity between the first face image and each face image stored in the server. Here, for the first implementable method for determining the second face image, the similarity between the first face image and each face image may be acquired by the following method.

The normalization method is used to normalize the distance value into a similarity value, where the normalization method includes a linear mapping, a piecewise linear mapping, or other methods of monotonic functions. Each of the above normalization methods is a method in the related art, and detailed description thereof will be omitted in the present embodiment.

The second confidence may be obtained by the following formula 2 to formula 4:

$$P(x) = \int_{-\infty}^{x} f(x \mid s) dx; \quad \text{formula 2}$$

$$f(x \mid s) = \frac{1}{\sqrt{2\pi}\,\sigma} e^{-\frac{(x-u)^2}{2\sigma^2}}; \quad \text{formula 3}$$

$$\sigma = \frac{1}{N} \sum_{i=1}^{N} (X_i - \overline{X})^2; \quad \text{formula 4}$$

Here, $\mu=\overline{X}$, $\overline{X}$ is the average value of all similarities, $N=C_{m_2 n_2}^2$, $m_2$ is the number of users corresponding to all face images stored in the server, and $n_2$ is the number of face images corresponding to the same user stored in the server; if the face images stored in the server correspond to the users one by one, then $n_2=1$, and $m_2$ is the number of the face images stored in the server.

For step 309, if the second confidence recognizing the current user as the user corresponding to the second face image is greater than or equal to the third threshold, the server sends the information of the target video to the terminal device according to the user profile corresponding to the second face image. If the second confidence recognizing the current user as the user corresponding to the second face image is less than the third threshold, the video cannot be recommended to the user, prompt information may be sent to the terminal device, and the prompt information is used to prompt the user that the video cannot be recommended to the user.

Here, the third threshold may be any value between 85 and 90.

If the second confidence is greater than or equal to the third threshold, it indicates that the credibility that the user corresponding to the second face image is the first user currently requesting the video recommendation is high, so that the target video recommended to the first user may be determined according to the user profile corresponding to the second face image, and the information of the target video is sent to the terminal device.

In addition, since the user of the terminal subscribes to some video contents that need to be paid according to the personalized requirements, the video recommendation request may further include the identifier of the terminal device, and the server sends the information of the target video to the terminal device according to the user profile corresponding to the second face image and the identifier of the terminal device, specifically includes: determining, by the server, according to the identifier of the terminal device, a video viewing right of a user of the terminal device, determining the target video from a plurality of videos corresponding to the video viewing right of the user of the terminal device according to the user profile corresponding to the second face image, and sending the information of the target video to the terminal device.

The process of acquiring the user profile stored in the server may be as follows: receiving voice 1 of user 1 operating the smart television sent by the terminal device, and recognizing the user 1 according to the voice 1 and a plurality of voices stored in the server, and the recognition method is the same as step 203 above. If the confidence recognizing the user corresponding to the voice 2 (the voice among the plurality of voices stored in the server) as the user 1 exceeds a preset threshold, the user corresponding to the voice 2 is considered to be the user 1, and the server corresponds the user data (the duration of the viewing, the video type, the channel, or the like) generated for the operation sent by the terminal device to the user identifier 1 (the user identifier corresponding to the voice 2) of the user 1. If the confidence recognizing the user corresponding to the voice 2 (the voice among the plurality of voices stored in the server) as the user 1 does not exceed the preset threshold, then the user 1 is recognized based on the face image of the user 1 and the plurality of face images stored in the server. If the confidence recognizing the user corresponding to the face image 2 (the face image among the plurality of face images stored in the server) as the user 1 exceeds the preset threshold, the user corresponding to the face image 2 is considered to be the user 1, and the server corresponds the user data (the duration of the viewing, the video type, the channel, or the like) generated for the operation sent by the terminal device to the user identifier 2 (the user identifier corresponding to the face image 2) of the user 1. The server may generate the user profile of the user 1 based on all the user data corresponding to the user identifier 1. It may be understood that the user identifier 1 and the user identifier 2 may be the same.

In addition, after the terminal device receives the information of the target video, if the first user views at least part of the video in the target video, the terminal device sends the operation data of the first user to the at least part of the video in the target video to the server.

The operation data may include a video type of the target video viewed by the user, a viewing duration, or the like. After the server receives these operational data, these operation data are the basis for the server to subsequently update the user profile, since the user profile is acquired based on the data of the corresponding user.

In the present embodiment, if the first confidence recognizing the current user as the user corresponding to the second voice is less than the first threshold and greater than the second threshold, the terminal device is controlled to acquire the face image, and the power consumption of the terminal may be economized.

In addition, if the confidence based on the recognition result of the voice recognition in the present embodiment is within a certain range, the current user is recognized based on the face image of the current user, and when the confidence based on the recognition result of the voice recognition exceeds a certain threshold, the video is recommended to the user based on the user profile corresponding to the recognition result, which improves the probability of recommending a video to the terminal device when the voiceprint recognition is abnormal (for example, the user has a cold and the voiceprint characteristic changes), and improves the accuracy of the video recommendation.

The method for recommending a video corresponding to all possible situations of the first confidence is described as follow.

Figure 4:
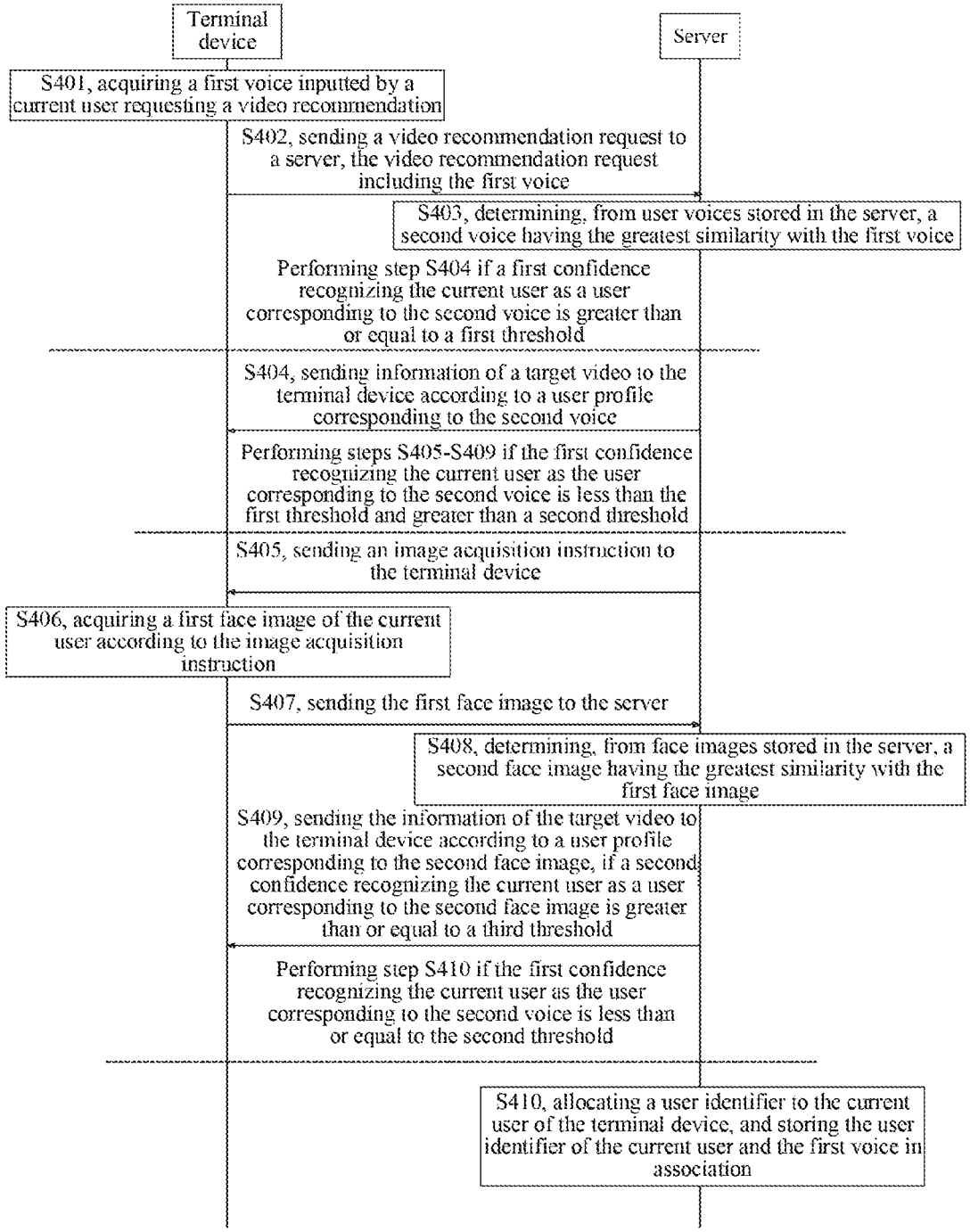
FIG. 4 is a signaling interaction diagram 3 of a method for recommending a video according to the present disclosure.

FIG. 4 is a signaling interaction diagram 3 of a method for recommending a video according to an embodiment of the present disclosure. Referring to FIG. 4, the method for recommending a video of the present embodiment includes the following steps.

Step S401, the terminal device acquires a first voice inputted by a current user requesting a video recommendation.

Step S402, the terminal device sends a video recommendation request to a server, the video recommendation request including the first voice;

Step S403, the server determines, from user voices stored in the server, a second voice having the greatest similarity with the first voice.

If a first confidence recognizing the current user as a user corresponding to the second voice is greater than or equal to a first threshold, step S404 is performed.

Step S404, the server sends information of a target video to the terminal device according to a user profile corresponding to the second voice.

If the first confidence recognizing the current user as the user corresponding to the second voice is less than the first threshold and greater than a second threshold, steps S405-409 are performed.

Step S405, the server sends an image acquisition instruction to the terminal device.

Step S406, the terminal device acquires a first face image of the current user according to the image acquisition instruction.

Step S407, the terminal device sends the first face image to the server.

Step S408, the server determines, from face images stored in the server, a second face image having the greatest similarity with the first face image.

Step S409, if a second confidence recognizing the current user as a user corresponding to the second face image is greater than or equal to a third threshold, sending the information of the target video to the terminal device according to a user profile corresponding to the second face image.

If the first confidence recognizing the current user as the user corresponding to the second voice is less than or equal to the second threshold, step S410 is performed.

Step S410, the server allocates a user identifier to the current user of the terminal device, and stores the user identifier of the current user and the first voice in association.

Specifically, steps S401 to S409 refer to steps S301 to S309 in the previous embodiment, and detailed description thereof will be omitted in the present embodiment.

For step S410, if the first confidence recognizing the current user as the user corresponding to the second voice is less than or equal to the second threshold, it indicates that the voice of the current user is not stored in the server. In this case, the server allocates a user identifier to the current user of the terminal device, and stores the identifier of the current user in association with the first voice to facilitate the subsequent voice recognition process. At this time, prompt information may be sent to the terminal device, and the prompt information is used to prompt the user that the video cannot be recommended to the user.

Figure 5:
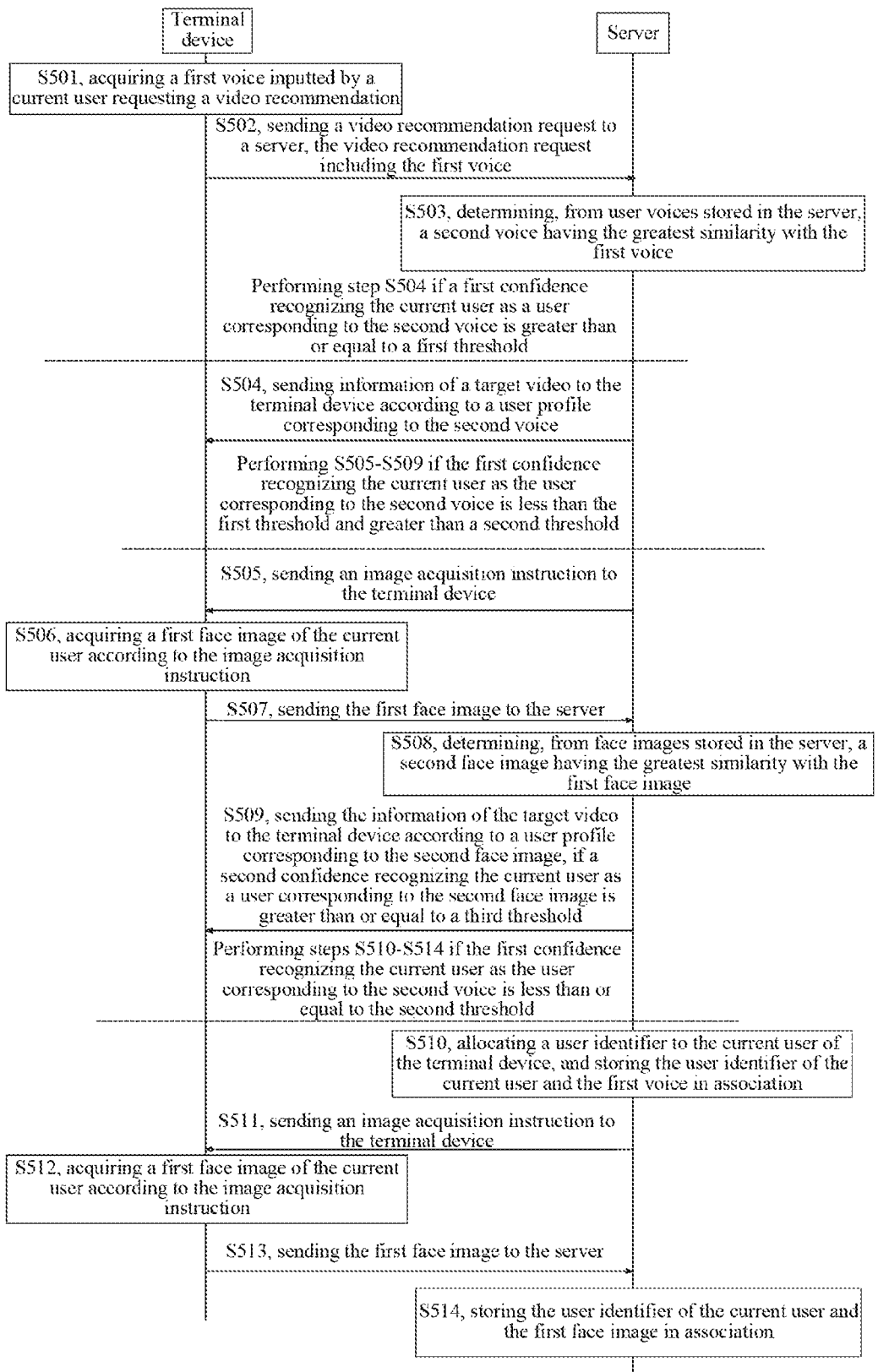
FIG. 5 is a signaling interaction diagram 4 of a method for recommending a video according to the present disclosure.

In order that when the credibility of voice recognition is not high, face recognition may be used to increase the probability of accurately recommending a video to the user, the present embodiment provides further improvements on the basis of the previous embodiment. FIG. 5 is a signaling interaction diagram 4 of a method for recommending a video according to an embodiment of the present disclosure. Referring to FIG. 5, the method for recommending a video of the present embodiment includes the following steps.

Step S501, the terminal device acquires a first voice inputted by a current user requesting a video recommendation.

Step S502, the terminal device sends a video recommendation request to a server, the video recommendation request including the first voice.

Step S503, the server determines, from user voices stored in the server, a second voice having the greatest similarity with the first voice.

If a first confidence recognizing the current user as a user corresponding to the second voice is greater than or equal to a first threshold, step S504 is performed.

Step S504, the server sends information of a target video to the terminal device according to a user profile corresponding to the second voice.

If the first confidence recognizing the current user as the user corresponding to the second voice is less than the first threshold and greater than a second threshold, steps S505-S509 are performed.

Step S505, the server sends an image acquisition instruction to the terminal device.

Step S506, the terminal device acquires a first face image of the current user according to the image acquisition instruction.

Step S507, the terminal device sends the first face image to the server.

Step S508, the server determines, from face images stored in the server, a second face image having the greatest similarity with the first face image.

Step S509, if a second confidence recognizing the current user as a user corresponding to the second face image is greater than or equal to a third threshold, sending the information of the target video to the terminal device according to a user profile corresponding to the second face image.

If the first confidence recognizing the current user as the user corresponding to the second voice is less than or equal to the second threshold, step S510 is performed.

Step S510, the server allocates a user identifier to the current user of the terminal device, and stores the user identifier of the current user and the first voice in association.

Step S511, the server sends an image acquisition instruction to the terminal device.

Step S512, the terminal device acquires a first face image of the current user according to the image acquisition instruction.

Step S513, the terminal device sends the first face image to the server.

Step S514, the server stores the user identifier of the current user and the first face image in association.

Specifically, steps S501 to S510 refer to steps S401 to S410 in the previous embodiment, and detailed description thereof will be omitted in the present embodiment.

For steps S511 to S514, if the first confidence recognizing the current user as the user corresponding to the second voice is less than or equal to the second threshold, the server sends an image acquisition instruction to the terminal device. The terminal device receives the image acquisition instruction, controls the camera to be turned on, acquires the first face image of the current user, and sends the first face image to the server. In this case, the server allocates a user identifier to the current user of the terminal device, and stores the user identifier of the current user in association with the first face image to facilitate the subsequent recognition process based on the face image.

In this way, the voice and the face image of the same person are in one-to-one correspondence, that is, in the present embodiment, when the credibility of voice recognition is not high, face recognition may be used to increase the probability of accurately recommending a video to the user.

Figure 6:
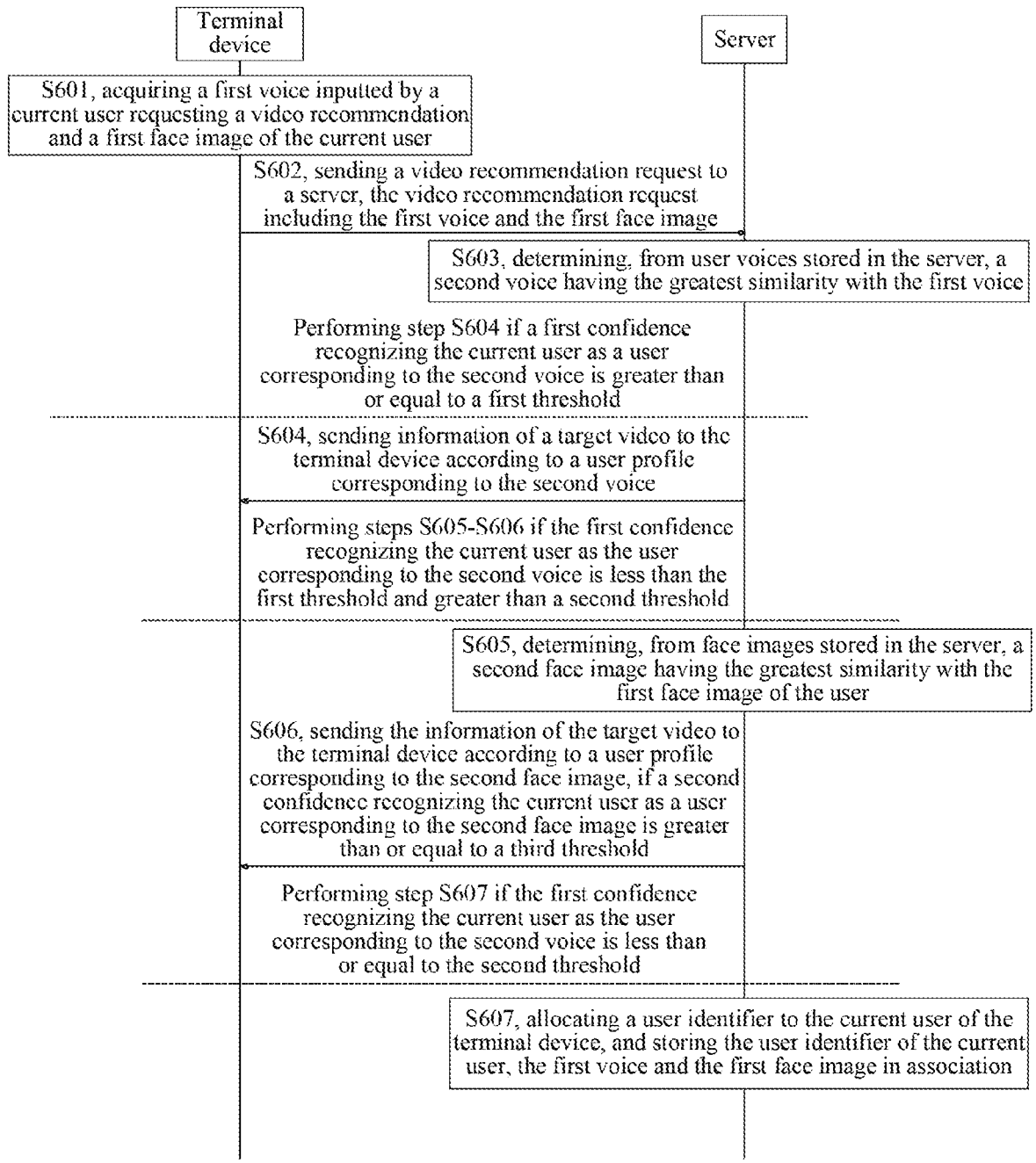
FIG. 6 is a signaling interaction diagram 5 of a method for recommending a video according to the present disclosure.

In order to improve the speed of video recommendation, the terminal device may acquire the first face image of the current user after the first voice requesting the video recommendation is sent by the user currently requesting the video recommendation, to improve the speed of video recommendation based on the face image when the voice recognition result is unreliable. FIG. 6 is a signaling interaction diagram 5 of a method for recommending a video according to an embodiment of the present disclosure. Referring to FIG. 6, the method for recommending a video of the present embodiment includes the following steps.

Step S601, the terminal device acquires a first voice inputted by a current user requesting a video recommendation and a first face image of the current user.

Step S602, the terminal device sends a video recommendation request to a server, the video recommendation request including the first voice and the first face image.

Step S603, the server determines, from user voices stored in the server, a second voice having the greatest similarity with the first voice.

If a first confidence recognizing the current user as a user corresponding to the second voice is greater than or equal to a first threshold, step S604 is performed.

Step S604, the server sends information of a target video to the terminal device according to a user profile corresponding to the second voice.

If the first confidence recognizing the current user as the user corresponding to the second voice is less than the first threshold and greater than a second threshold, steps S605-606 are performed.

Step S605, determining, from face images stored in the server, a second face image having the greatest similarity with the first face image of the user.

Step S606, if a second confidence recognizing the current user as a user corresponding to the second face image is greater than or equal to a third threshold, sending the information of the target video to the terminal device according to a user profile corresponding to the second face image.

If the first confidence recognizing the current user as the user corresponding to the second voice is less than or equal to the second threshold, step S607 is performed.

Step S607, the server allocates a user identifier to the current user of the terminal device, and stores the user identifier of the current user, the first voice and the first face image in association.

Specifically, in the present embodiment, after the first voice is acquired by the terminal device or when the first voice is acquired, the first face image of the current user is also acquired, so that if the first confidence recognizing the current user as the user corresponding to the second voice is less than the first threshold and greater than the second threshold, the process of the server interacting with the terminal device to acquire the first face image is not needed, and the speed of video recommendation is improved.

The remaining steps except for the step S601 in the present embodiment are the same as those in the other embodiments, and detailed description thereof will be omitted.

In the present embodiment, after the first voice is acquired by the terminal device or when the first voice is acquired, the first face image of the current user is also acquired, and when the first confidence recognizing the current user as the user corresponding to the second voice is less than the first threshold and greater than the second threshold, the corresponding speed of video recommendation is improved.

In actual applications, sometimes a third-party server is required to provide the target video. The method for recommending a video in this case will be described below.

Figure 7:
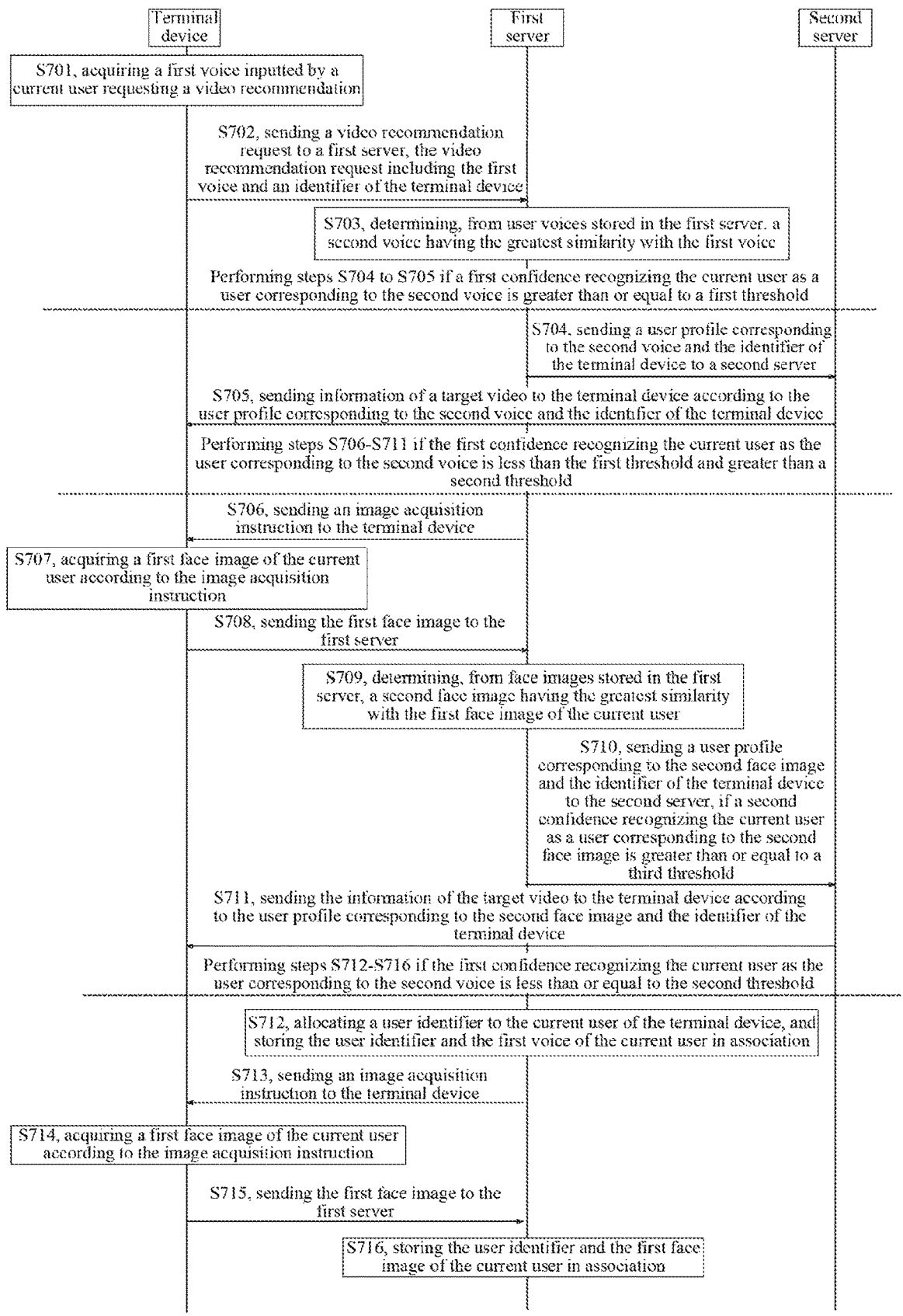
FIG. 7 is a signaling interaction diagram 6 of a method for recommending a video according to the present disclosure.

FIG. 7 is a signaling interaction diagram 6 of a method for recommending a video according to an embodiment of the present disclosure. Referring to FIG. 7, the method for recommending a video of the present embodiment includes the following steps.

Step S701, the terminal device acquires a first voice inputted by a current user requesting a video recommendation.

Step S702, the terminal device sends a video recommendation request to a first server, the video recommendation request including the first voice and an identifier of the terminal device.

Step S703, the first server determines, from user voices stored in the first server, a second voice having the greatest similarity with the first voice.

If a first confidence recognizing the current user as a user corresponding to the second voice is greater than or equal to a first threshold, steps S704 to S705 are performed.

Step S704, the first server sends a user profile corresponding to the second voice and the identifier of the terminal device to a second server.

Step S705, the second server sends information of a target video to the terminal device according to the user profile corresponding to the second voice and the identifier of the terminal device.

If the first confidence recognizing the current user as the user corresponding to the second voice is less than the first threshold and greater than a second threshold, steps S706-711 are performed.

Step S706, the first server sends an image acquisition instruction to the terminal device.

Step S707, the terminal device acquires a first face image of the current user according to the image acquisition instruction.

Step S708, the terminal device sends the first face image to the first server.

Step S709, the first server determines, from face images stored in the first server, a second face image having the greatest similarity with the first face image of the current user.

Step S710, if a second confidence recognizing the current user as a user corresponding to the second face image is greater than or equal to a third threshold, the first server sends a user profile corresponding to the second face image and the identifier of the terminal device to the second server.

Step S711, the second server sends the information of the target video to the terminal device according to the user profile corresponding to the second face image and the identifier of the terminal device.

If the first confidence recognizing the current user as the user corresponding to the second voice is less than or equal to the second threshold, steps S712-S716 are performed.

Step S712, the first server allocates a user identifier to the current user of the terminal device, and stores the user identifier and the first voice of the current user in association.

Step S713, the first server sends an image acquisition instruction to the terminal device.

Step S714, the terminal device acquires a first face image of the current user according to the image acquisition instruction.

Step S715, the terminal device sends the first face image to the first server.

Step S716, the first server stores the user identifier and the first face image of the current user in association.

Specifically, the steps S701 to S703 in the present embodiment refer to the related steps in the embodiment shown in FIG. 2, and detailed description thereof will be omitted in the present embodiment.

For steps S704 to S705, if the first confidence recognizing the current user as the user corresponding to the second voice is greater than or equal to the first threshold, the first server sends the user profile corresponding to the second voice and the identifier of the terminal device to the second server; and the second server sends the information of the target video to the terminal device according to the user profile corresponding to the second voice and the identifier of the terminal device.

At this time, there is no video resource stored in the first server, and the video resource is on the second server corresponding to the terminal device, for example, the second server may be a dedicated server corresponding to the smart television of the xx brand.

Steps S706 to S709 in the present embodiment refer to the related steps in the embodiment shown in FIG. 3, and detailed description thereof will be omitted in the present embodiment.

For steps S710 to S711, if the second confidence recognizing the current user as the user corresponding to the second face image is greater than or equal to the third threshold, the first server sends the user profile corresponding to the second face image and the identifier of the terminal device to the second server; and the second server sends the information of the target video to the terminal device according to the user profile corresponding to the second face image and the identifier of the terminal device.

At this time, there is no video resource stored in the first server, and the video resource is on the second server corresponding to the terminal device, for example, the second server may be a dedicated server corresponding to the smart television of the xx brand.

Steps S712 to S716 in the present embodiment refer to the related steps in the embodiment shown in FIG. 4, and detailed description thereof will be omitted in the present embodiment.

The method of the present embodiment improves the accuracy of video recommendation and the probability of being able to recommend a video to the terminal device, and the video recommendation of the dedicated server to the terminal device may also be implemented.

Figure 8:
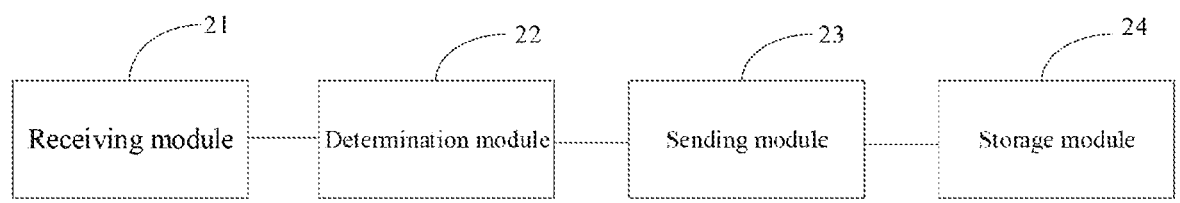
FIG. 8 is a schematic structural diagram of Embodiment 1 of an apparatus for recommending a video according to an embodiment of the present disclosure.

FIG. 8 is a schematic structural diagram of Embodiment 1 of an apparatus for recommending a video according to an embodiment of the present disclosure. As shown in FIG. 8, the apparatus of the present embodiment may include: a receiving module 21, a determination module 22, a sending module 23, and a storage module 24.

The receiving module 21 is configured to receive a video recommendation request sent by a terminal device, the video recommendation request including a first voice, the first voice being a voice inputted by a user requesting a video recommendation.

The determination module 22 is configured to determine, from user voices stored in a server, a second voice having a greatest similarity with the first voice.

The sending module 23 is configured to send information of a target video to the terminal device according to a user profile corresponding to the second voice, if a first confidence recognizing the user as a user corresponding to the second voice is greater than or equal to a first threshold.

If the first confidence is less than or equal to a second threshold, the storage module 24 is configured to allocate a user identifier to the user of the terminal device, and store the user identifier and the first voice in association.

The apparatus of the present embodiment may be used to implement the technical solution of the above method embodiment, and the implementation principle and the technical effect are similar, and detailed description thereof will be omitted.

In an embodiment, the video recommendation request further includes an identifier of the terminal device; and then the sending module 23 is specifically configured to send the information of the target video to the terminal device according to the user profile corresponding to the second voice and the identifier of the terminal device.

In an embodiment, the video recommendation request further includes a first face image of the user, and if the first confidence is less than the first threshold and greater than a second threshold, the determination module 22 is configured to determine, from face images stored in the server, a second face image having a greatest similarity with the first face image of the user; and the sending module 23 is configured to send the information of the target video to the terminal device according to a user profile corresponding to the second face image and the identifier of the terminal device, if a second confidence recognizing the user as a user corresponding to the second face image is greater than or equal to a third threshold.

In an embodiment, if the first confidence is less than the first threshold and greater than a second threshold, the receiving module 21 is configured to receive a first face image of the user sent by the terminal device; the determination module 22 is configured to determine, from face images stored in the server, a second face image having a greatest similarity with the first face image of the user; and the sending module 23 is configured to send the information of the target video to the terminal device according to a user profile corresponding to the second face image and the identifier of the terminal device, if a second confidence recognizing the user as a user corresponding to the second face image is greater than or equal to a third threshold.

In an embodiment, before the receiving a first face image of the user sent by the terminal device, the sending module 23 is further configured to send an image acquisition instruction to the terminal device, the image acquisition instruction being used to instruct the terminal device to acquire the first face image of the user.

In an embodiment, if the first confidence is less than or equal to a second threshold, the receiving module 21 is further configured to receive a first face image of the user sent by the terminal device; and the storage module 24 is further configured to store the user identifier and the first face image in association.

In an embodiment, the sending module 23 is specifically configured to: determine, according to the identifier of the terminal device, a video viewing right of a user of the terminal device; determine the target video from a plurality of videos corresponding to the video viewing right of the user of the terminal device according to the user profile corresponding to the second voice; and send the information of the target video to the terminal device.

In an embodiment, the determination module 22 is specifically configured to: acquire a first characteristic vector of the first voice according to a voiceprint characteristic of the first voice and a neural network algorithm; and determine, according to the first characteristic vector and a second characteristic vector of each user voice stored in the server, the second voice having the greatest similarity with the first voice from the user voices stored in the server.

In an embodiment, the determination module 22 is further specifically configured to: acquire a third characteristic vector of the first face image according to an image characteristic of the first face image and a neural network algorithm; and determine, according to the third characteristic vector and a fourth characteristic vector of each face image stored in the server, the second face image having the greatest similarity with the first face image in the face images stored in the server.

The apparatus of the present embodiment may be used to implement the technical solution of the above method embodiment, where the implementation principle and the technical effect are similar, and detailed description thereof will be omitted.

Figure 9:
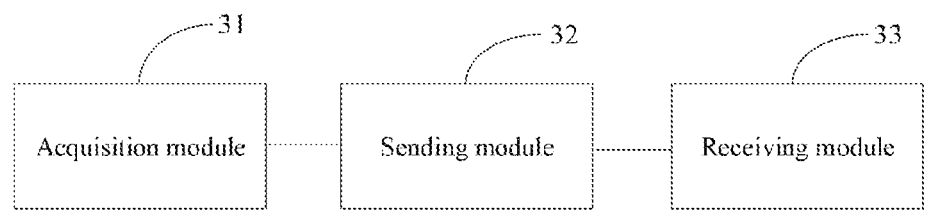
FIG. 9 is a schematic structural diagram of Embodiment 2 of an apparatus for recommending a video according to an embodiment of the present disclosure.

FIG. 9 is a schematic structural diagram of Embodiment 2 of an apparatus for recommending a video according to an embodiment of the present disclosure. As shown in FIG. 9, the apparatus of the present embodiment may include: an acquisition module 31, a sending module 32, and a receiving module 33.

The acquisition module 31 is configured to acquire a first voice inputted by a user requesting a video recommendation.

The sending module 32 is configured to send a video recommendation request to a server, the video recommendation request including the first voice.

The receiving module 33 is configured to receive information of a target video sent by the server; the information of the target video being acquired according to a user profile corresponding to a second voice, after the server determining that a first confidence recognizing the user as a user corresponding to the second voice being greater than or equal to a first threshold; or, the information of the target video being acquired according to a user profile corresponding to a second face image, after the server determining that the first confidence recognizing the user as the user corresponding to the second voice being less than the first threshold and greater than a second threshold, and a second confidence recognizing the user as a user corresponding to the second face image being greater than or equal to a third threshold.

The apparatus of the present embodiment may be used to implement the technical solution of the above method embodiment, and the implementation principle and the technical effect are similar, and detailed description thereof will be omitted.

In an embodiment, the video recommendation request further includes an identifier of the terminal device; and the information of the target video is acquired according to a user profile corresponding to a second voice and the identifier of the terminal device, after the server determining that a first confidence recognizing the user as a user corresponding to the second voice being greater than or equal to a first threshold; or, the information of the target video is acquired according to a user profile corresponding to a second face image and the identifier of the terminal device, after the server determining that the first confidence recognizing the user as the user corresponding to the second voice being less than the first threshold and greater than a second threshold, and a second confidence recognizing the user as a user corresponding to the second face image being greater than or equal to a third threshold.

The apparatus of the present embodiment may be used to implement the technical solution of the above method embodiment, and the implementation principle and the technical effect are similar, and detailed description thereof will be omitted.

In an embodiment, the acquisition module 31 is specifically configured to: acquire the first voice inputted by the user requesting the video recommendation and a first face image of the user.

The sending module 32 is specifically configured to send the video recommendation request to the server, the video recommendation request including the first voice, the identifier of the terminal device and the first face image.

In an embodiment, the receiving module 33 is further configured to receive an image acquisition instruction sent by the server.

The acquisition module 31 is further configured to acquire a first face image of the user according to the image acquisition instruction.

The sending module 32 is further configured to send the first face image to the server.

The embodiments of the present disclosure provide a computer readable storage medium, storing a computer program thereon, the program causes a processor to implement the method corresponding to the server in the above method embodiment.

Figure 10:
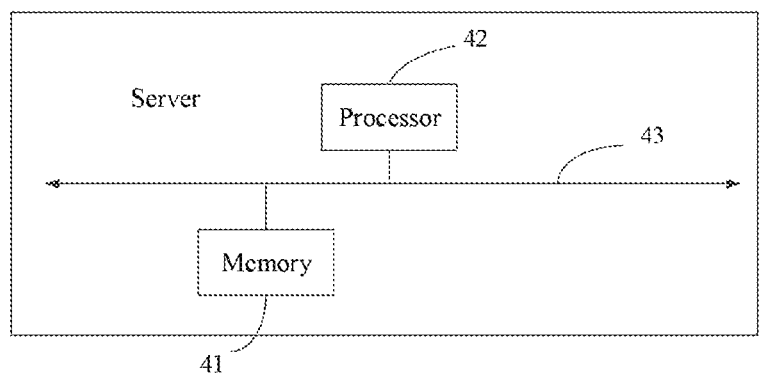
FIG. 10 is a schematic structural diagram of a server according to an embodiment of the present disclosure.

FIG. 10 is a schematic structural diagram of a server according to an embodiment of the present disclosure, including: a memory 41, a processor 42 and a communication bus 43; the communication bus 43 is used to implement the connection between the components.

The memory 41 is used for storing program instructions.

The processor 42 is used for invoking the program instructions stored in the memory to implement the method performed by the server in the above method embodiment.

The server according to the embodiments of the present disclosure may perform the above corresponding method embodiment, and the implementation principle and the technical effect are similar, and detailed description thereof will be omitted.

The embodiments of the present disclosure provide a computer readable storage medium, storing a computer program thereon, the program causes a processor to implement the method corresponding to the terminal device in the above method embodiment.

Figure 11:
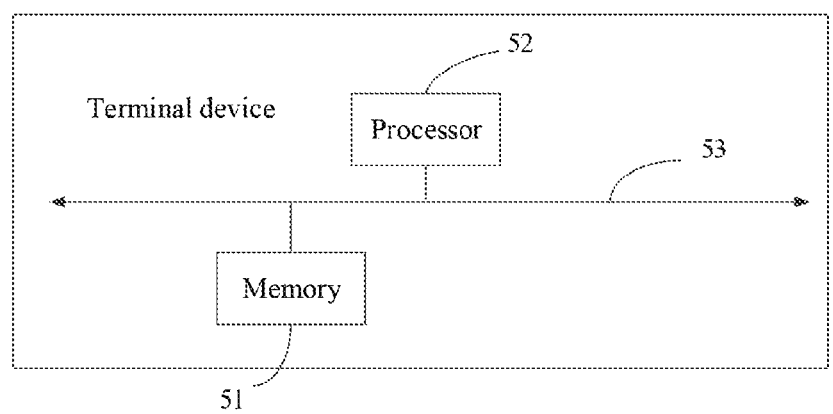
FIG. 11 is a schematic structural diagram of a terminal device according to an embodiment of the present disclosure.

FIG. 11 is a schematic structural diagram of a terminal device according to an embodiment of the present disclosure, including: a memory 51, a processor 52 and a communication bus 53; the communication bus 53 is used to implement the connection between the components.

The memory 51 is used for storing program instructions.

The processor 52 is used for invoking the program instructions stored in the memory to implement the method performed by the terminal device in the above method embodiment.

The terminal device according to the embodiments of the present disclosure may perform the above corresponding method embodiment, and the implementation principle and the technical effect are similar, and detailed description thereof will be omitted.

It may be understood by those skilled in the art that all or part of the steps of implementing the preceding method embodiments may be performed by hardware related to the program instructions. The aforementioned program may be stored in a computer readable storage medium. The program, when being executed, performs the steps including the preceding method embodiments; and the storage medium includes various mediums that may store program codes, such as ROMs, RAMs, magnetic disks, or optical disks.

Finally, it should be noted that the above embodiments are merely illustrative of the technical solutions of the present disclosure, and are not intended to be limiting. The present disclosure is described in detail with reference to the preceding embodiments, but those skilled in the art should understand that the technical solutions described in the preceding embodiments may be modified, or some or all of the technical characteristics may be equivalently replaced; and the modifications or replacements do not cause the essence of the corresponding technical solutions to depart from the scope of the technical solutions according to the embodiments of the present disclosure.

What is claimed is:

1. A method for recommending a video, the method comprising:
receiving a video recommendation request sent by a terminal device, the video recommendation request comprising a first voice, the first voice being a voice inputted by a user requesting a video recommendation, wherein the video recommendation request further comprises a terminal identifier for identifying the terminal device;

determining, from user voices stored in a server, a second voice having a greatest similarity with the first voice;

determining a user profile corresponding to the second voice, the user profile comprising a user identifier, the terminal identifier and data generated by an operation of the user on the terminal device;

determining a target video according to the user profile corresponding to the second voice; and sending information of the target video to the terminal device, if a first confidence recognizing the user as a user corresponding to the second voice being greater than or equal to a first threshold.

2. The method according to claim 1, the sending information of a target video to the terminal device according to a user profile corresponding to the second voice comprises:

sending the information of the target video to the terminal device according to the user profile corresponding to the second voice and the identifier of the terminal device.

3. The method according to claim 1, wherein, if the first confidence is less than or equal to a second threshold, the method further comprises:

allocating a user identifier to the user of the terminal device, and storing the user identifier and the first voice in association.

4. The method according to claim 1, wherein the determining, from user voices stored in a server, a second voice having a greatest similarity with the first voice, comprises:

acquiring a first characteristic vector of the first voice according to a voiceprint characteristic of the first voice and a neural network algorithm; and determining, according to the first characteristic vector and a second characteristic vector of each user voice stored in the server, the second voice having the greatest similarity with the first voice from the user voices stored in the server.

5. The method according to claim 1, wherein the method further comprises: sending the user profile corresponding to the second voice and comprising the terminal identifier to a dedicated server for to a type of the terminal device; and sending by the dedicated server the video to the terminal device.

6. The method according to claim 2, wherein the video recommendation request further comprises a first face image of the user, and if the first confidence is less than the first threshold and greater than a second threshold, the method further comprises:

determining, from face images stored in the server, a second face image having a greatest similarity with the first face image of the user; and sending the information of the target video to the terminal device according to a user profile corresponding to the second face image and the identifier of the terminal device, if a second confidence recognizing the user as a user corresponding to the second face image being greater than or equal to a third threshold.

7. The method according to claim 2, wherein, if the first confidence is less than the first threshold and greater than a second threshold, the method further comprises:

receiving a first face image of the user sent by the terminal device; and determining, from face images stored in the server, a second face image having a greatest similarity with the first face image of the user; and sending the information of the target video to the terminal device according to a user profile corresponding to the second face image and the identifier of the terminal device, if a second confidence recognizing the user as a user corresponding to the second face image being greater than or equal to a third threshold.

8. The method according to claim 2, wherein the sending the information of the target video to the terminal device according to the user profile corresponding to the second voice and the identifier of the terminal device comprises:

determining, according to the identifier of the terminal device, a video viewing right of a user of the terminal device;

determining the target video from a plurality of videos corresponding to the video viewing right of the user of the terminal device according to the user profile corresponding to the second voice; and sending the information of the target video to the terminal device.

9. The method according to claim 6, wherein the determining, from face images stored in the server, a second face image having a greatest similarity with the first face image of the user comprises:

acquiring a third characteristic vector of the first face image according to an image characteristic of the first face image and a neural network algorithm; and determining, according to the third characteristic vector and a fourth characteristic vector of each face image stored in the server, the second face image having the greatest similarity with the first face image in the face images stored in the server.

10. The method according to claim 7, wherein before the receiving a first face image of the user sent by the terminal device, the method further comprises:

sending an image acquisition instruction to the terminal device, the image acquisition instruction being used to instruct the terminal device to acquire the first face image of the user.

11. The method according to claim 3, the method further comprising:

receiving a first face image of the user sent by the terminal device; and storing the user identifier and the first face image in association.

12. A method for recommending a video, the method comprising:

acquiring a first voice inputted by a user requesting a video recommendation;

sending a video recommendation request to a server, the video recommendation request comprising the first voice, wherein the video recommendation request further comprises a terminal identifier for identifying the terminal device; and receiving information of a target video sent by the server; the information of the target video being acquired according to a user profile corresponding to a second voice, after the server determining that a first confidence recognizing the user as a user corresponding to the second voice being greater than or equal to a first threshold; or, the information of the target video being acquired according to a user profile corresponding to a second face image, after the server determining that the first confidence recognizing the user as the user corresponding to the second voice being less than the first threshold and greater than a second threshold, and a second confidence recognizing the user as a user corresponding to the second face image being greater than or equal to a third threshold, wherein the target video is acquired by determining the user profile corresponding to the second voice, the user profile comprising a user identifier, the terminal identifier and data generated by an operation of the user on the terminal device, and determining the target video according to the user profile corresponding to the second voice.

13. The method according to claim 12, the information of the target video being acquired according to the user profile corresponding to the second voice and the identifier of the terminal device, after the server determining that the first confidence recognizing the user as the user corresponding to the second voice being greater than or equal to the first threshold; or, the information of the target video being acquired according to the user profile corresponding to the second face image and the identifier of the terminal device, after the server determining that the first confidence recognizing the user as the user corresponding to the second voice being less than the first threshold and greater than the second threshold, and the second confidence recognizing the user as the user corresponding to the second face image being greater than or equal to the third threshold.

14. The method according to claim 12, the method further comprising:
receiving an image acquisition instruction sent by the server;
acquiring a first face image of the user according to the image acquisition instruction; and
sending the first face image to the server.

15. The method according to claim 13, wherein the acquiring a first voice inputted by a user requesting a video recommendation comprises:
acquiring the first voice inputted by the user requesting the video recommendation and a first face image of the user; and
the sending a video recommendation request to a server, the video recommendation request comprising the first voice and the identifier of the terminal device, comprises:
sending the video recommendation request to the server, the video recommendation request comprising the first voice, the identifier of the terminal device and the first face image.

16. An apparatus for recommending a video, the apparatus comprising:
at least one processor; and
a memory storing instructions, the instructions when executed by the at least one processor, cause the at least one processor to perform operations, the operations comprising:
receiving a video recommendation request sent by a terminal device, the video recommendation request comprising a first voice, the first voice being a voice inputted by a user requesting a video recommendation, wherein the video recommendation request further comprises a terminal identifier for identifying the terminal device;
determining, from user voices stored in a server, a second voice having a greatest similarity with the first voice;
determining a user profile corresponding to the second voice, the user profile comprising a user identifier, the terminal identifier and data generated by an operation of the user on the terminal device;
determining a target video according to the user profile corresponding to the second voice; and
sending information of a target video to the terminal device according to a user profile corresponding to the second voice, if a first confidence recognizing the user as a user corresponding to the second voice being greater than or equal to a first threshold.

17. An apparatus for recommending a video, the apparatus comprising:
at least one processor; and
a memory storing instructions, the instructions when executed by the at least one processor, cause the at least one processor to perform operations, the operations comprising:
acquiring a first voice inputted by a user requesting a video recommendation;
sending a video recommendation request to a server, the video recommendation request comprising the first voice, wherein the video recommendation request further comprises a terminal identifier for identifying the terminal device; and
receiving information of a target video sent by the server; the information of the target video being acquired according to a user profile corresponding to a second voice, after the server determining that a first confidence recognizing the user as a user corresponding to the second voice being greater than or equal to a first threshold; or, the information of the target video being acquired according to a user profile corresponding to a second face image, after the server determining that the first confidence recognizing the user as the user corresponding to the second voice being less than the first threshold and greater than a second threshold, and a second confidence recognizing the user as a user corresponding to the second face image being greater than or equal to a third threshold, wherein the target video is acquired by determining the user profile corresponding to the second voice, the user profile comprising a user identifier, the terminal identifier and data generated by an operation of the user on the terminal device, and determining the target video according to the user profile corresponding to the second voice.

18. The method according to claim 5, wherein the server storing the user voices are different from the dedicated server.

19. The method according to claim 5, wherein the type of the terminal device comprises a smart television.

* * * * *